United States Patent [19]

Smith et al.

[11] Patent Number: 5,335,304
[45] Date of Patent: Aug. 2, 1994

[54] CONNECTOR DISTRIBUTION ASSEMBLY FOR A FIBER OPTIC DETECTOR SYSTEM

[75] Inventors: Dale Smith, Baltimore; Gregory P. Behrmann, Columbia, both of Md.

[73] Assignee: The United States of America as represented by the Secretary of the Army, Washington, D.C.

[21] Appl. No.: 54,499

[22] Filed: Apr. 30, 1993

[51] Int. Cl.⁵ .................................... G02B 6/36
[52] U.S. Cl. .................................... 385/135; 385/147
[58] Field of Search .................. 385/133–135, 385/147

[56] References Cited

U.S. PATENT DOCUMENTS

| | | | |
|---|---|---|---|
| 4,818,054 | 4/1989 | George et al. | 385/147 X |
| 5,129,030 | 7/1992 | Petrunia | 385/135 |
| 5,133,038 | 7/1992 | Zipper | 385/135 |
| 5,136,675 | 8/1992 | Hodson | 385/147 X |
| 5,231,687 | 7/1993 | Handley | 385/135 X |
| 5,235,665 | 8/1993 | Marchesi et al. | 385/134 X |
| 5,239,609 | 8/1993 | Auteri | 385/147 X |
| 5,243,679 | 9/1993 | Sharrow et al. | 385/134 X |

*Primary Examiner*—Akm E. Ullah
*Attorney, Agent, or Firm*—Freda L. Krosnick; Frank J. Dynda

[57] ABSTRACT

An optical fiber connector distribution assembly including a front piece, a fan out area, and a back piece. A bundle of thin optical fibers from a focal plane array is connected to the assembly by a monocoil and a strain relief. A bottom half and a top half of the front piece include eight corresponding semi-cylindrical recesses, four on each side of a relatively larger central recess having a connection for the strain relief. When the top and bottom halves of the front piece are connected, each of the eight cylindrical portions formed by the corresponding semi-cylindrical recesses receives first and second halves of an optical fiber connector. Bottom and top halves of the back piece also similarly house first and second halves of connectors. Once inside the assembly, the fibers are split into groups in the fan out area. Each group then enters the first half of the connector where it is transformed into a linear array of fibers. The second half of the connector houses a corresponding linear array of larger diameter fibers. The assembly fixedly but removably holds the connectors in place by respective set screws. Shock and vibration isolation is achieved by placing the assembly on a shock/vibration isolation pad.

4 Claims, 8 Drawing Sheets

CONNECTOR DISTRIBUTION ASSEMBLY FOR A FIBER OPTIC DETECTOR SYSTEM

BACKGROUND OF THE INVENTION

1. Field of the Invention

This invention relates to orienting optical fibers and, more particularly, to a connector distribution assembly in a fiber optic detector system for receiving groups of optical fibers and protectively distributing the groups through separate connectors.

2. Background Art

A fiber optic detector system is capable of detecting light intensity and modulation. At a first end of the system, optical fibers are arranged linearly and horizontally in a focal plane array. These fibers have a small diameter, which enables tight packing of many fibers.

Light enters these small diameter fibers and travels therethrough to a first half of an optical fiber connector. The light then enters a corresponding number of larger diameter fibers located in a second half of the connector, and travels to an amplifying detector at a second end of the system.

The detector includes a plurality of detector cards, each having a plurality of detector cans mounted on a PC board or similar mount. The larger fibers are pigtailed into the detector cans and are precisely positioned over a photodiode. The detector gives off a voltage representative of the light intensity and modulation received at the first end of the system, thereby allowing the user to measure these parameters.

Such a system usually is used in a laboratory tool that is handled roughly. As a result of this handling, the system must be able to maintain alignment of the respective small and large diameter fibers in the respective connector halves to prevent light leakage, which would cause inaccurate measurements. Light leakage can also occur if dust settles between the two halves of each connector.

Further, during movement of the system and positioning of the focal plane array, the fibers experience pulling and strain. Should any of the fibers break, the system will be disabled until repairs can be made.

Finally, the fibers extending from the focal plane array must be allowed easy, compact, and protected distribution to their respective connector halves, and any distribution means must be receivable in a standard electronics chassis.

Previous designs have placed the connector halves in an unorganized manner in the chassis and tie-wrapped them in place. The problem with this approach is disorganization, bad shock/vibration isolation, poor strain relief, not enough ruggedness, and dust infiltration.

Alternatively, other connector designs have been used that are more rugged, incorporate guide grooves for the fibers, and are used for groups of up to eighteen fibers. This results in a more complicated connector design. It is doubted whether this design could work with higher numbers of fibers per group.

SUMMARY OF THE INVENTION

Accordingly, it is a purpose of the present invention to provide a connector distribution assembly which can take groups of optical fibers originating from a single cable and protectively distribute them to separate respective connectors.

It is another purpose of the present invention to provide a connector distribution assembly that distributes optical fibers to a plurality of connectors and still fits into a standard electronics chassis.

It is another purpose of the present invention to provide a connector distribution assembly that ruggedly protects the connectors, but allows easy removal of the connectors when desired.

It is another purpose of the present invention to provide a connector distribution assembly with better vibration and shock isolation, strain relief and protection of optical fibers, and a dust-free environment.

Finally, it is a purpose of the present invention to provide a connector distribution assembly that allows for easy repair and connection/disconnection of connector halves.

To achieve the foregoing and other purposes of the present invention, there is provided a connector distribution assembly for a fiber optic detector system. A bundle of relatively small diameter optical fibers from a focal plane array is connected to the assembly by a strain relief. The assembly includes a fan out block having a fan out area located between a front piece and a back piece. Once inside the assembly, the bundle splits at the fan out area into groups of fibers. A cover protects the fibers in the fan out area from being damaged.

A bottom half and a top half of the front piece each include eight, parallel, semi-cylindrical recesses, four on each side of a relatively larger central recess. On the front surface of each bottom and top half there are formed corresponding partial connections for the strain relief.

When the top and bottom halves of the front piece are connected, there is formed a central cylindrical portion flanked by two sets of four relatively smaller cylindrical portions. The central portion receives the bundle of fibers and each of the relatively smaller cylindrical portions receives the two halves of each connector.

Bottom and top halves of the back piece are also configured to similarly house eight connectors.

From the fan out area, each group of fibers enters a respective first half of a connector where it is transformed into a linear array of fibers. The second half of the connector houses a corresponding linear array of larger diameter fibers. The connector halves in each pair are fastened together with screws, thus butt-coupling the two linear arrays of fibers. Light is transferred from one array to the other with little light loss.

The assembly rigidly holds the connectors in place by a plurality of small holes formed in the top halves of the front and back pieces, each corresponding to a connector, and a set screw in each hole. This keeps the connector from moving with respect to the connector distribution assembly.

Shock and vibration isolation is achieved by placing the assembly on a shock/vibration isolation pad.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

The preferred embodiments according to the present invention will now be described in detail with reference to FIGS. 1-14, FIG, 1, a schematic view of a fiber optic detector system 10, illustrates a first embodiment of a connector distribution assembly 12 according to the present invention. In this embodiment the assembly 12 distributes five hundred and twelve fibers.

Figure 1:
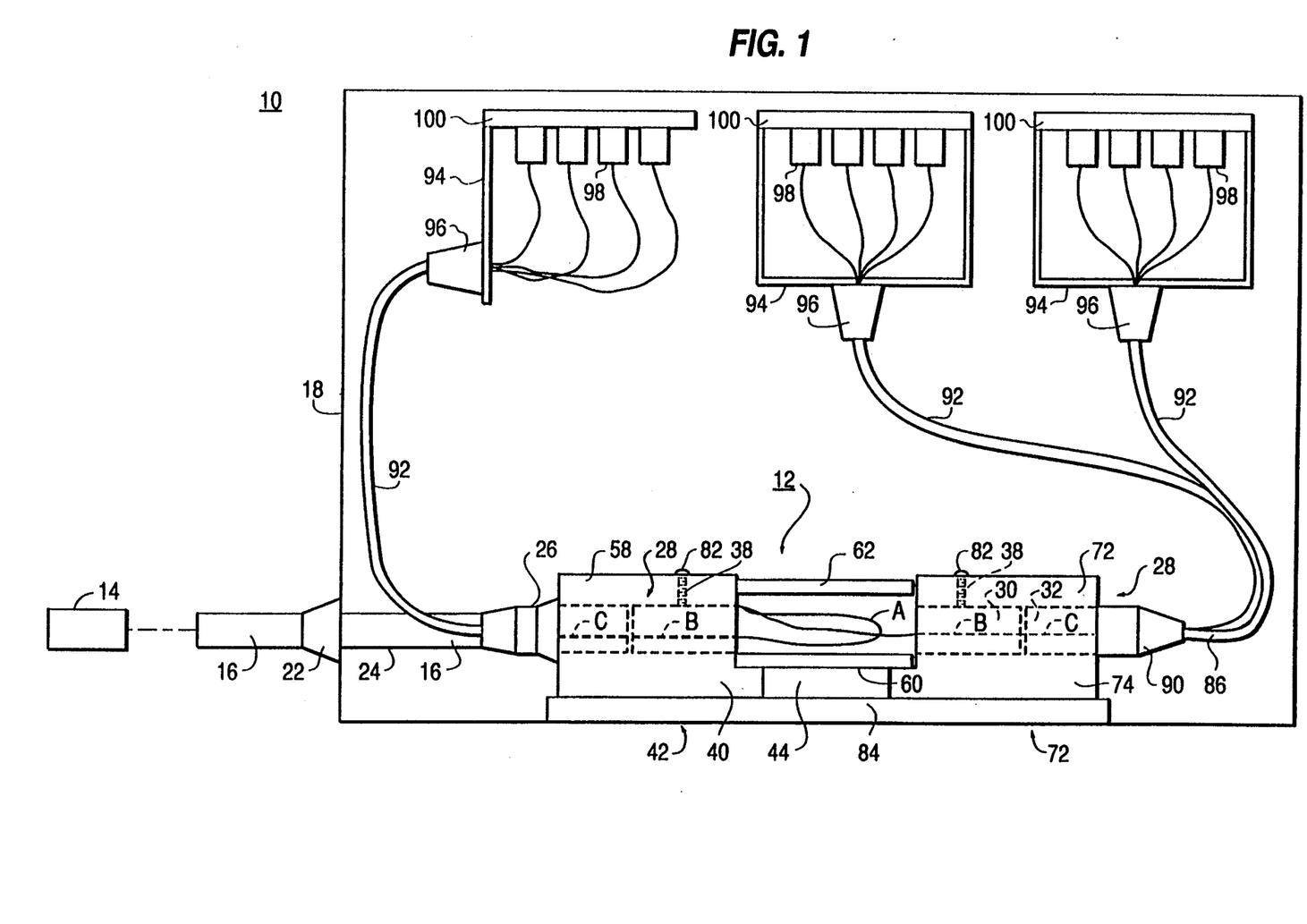
FIG. 1 is a schematic view of a first embodiment of a connector distribution assembly according to the present invention used in a fiber optic detector system.

The system 10 includes, in addition to the assembly 12, a focal plane array 14 where a linear array of the five hundred and twelve fibers, each having the same particular diameter, is transformed to a round cross-sectional bundle or cable 16.

A preferred focal plane array 14 for use with this invention is described in the Assignee's co-pending application (to be filed) entitled "Focal Plane Array Mount for a Fiber Optic Detector System and Related Method of Assembly Ser. No. 08/069,811 filed on Jun. 1, 1993, now pending," the disclosure of which is expressly incorporated herein.

In the cable 16, the five hundred and twelve fibers are separated into sixteen groups A of thirty-two fibers each. Each group is wrapped in a vinyl cover. These sixteen groups A are then wrapped in a monocoil 20 which terminates in a strain relief 22 that screws into a chassis 18.

The monocoil 20, and the other monocoils described herein, is made of a wire wrap covered by vinyl to protect the fibers from crushing and extreme bending. Such a monocoil is available commercially from many vendors.

The strain relief 22, and the other strain reliefs described herein, allows gradual movement restriction of the fibers as they enter the more restrictive connector distribution assembly 12. The strain relief is available from Heyco Molded Products of Kenilworth, N.J.

The bundle 16 continues through the cover 18 and connects to the assembly 12, again by a monocoil 24 and strain relief 26.

The assembly 12 includes generally a front piece 42, a fan out block 44, and a back piece 72.

Figure 2:
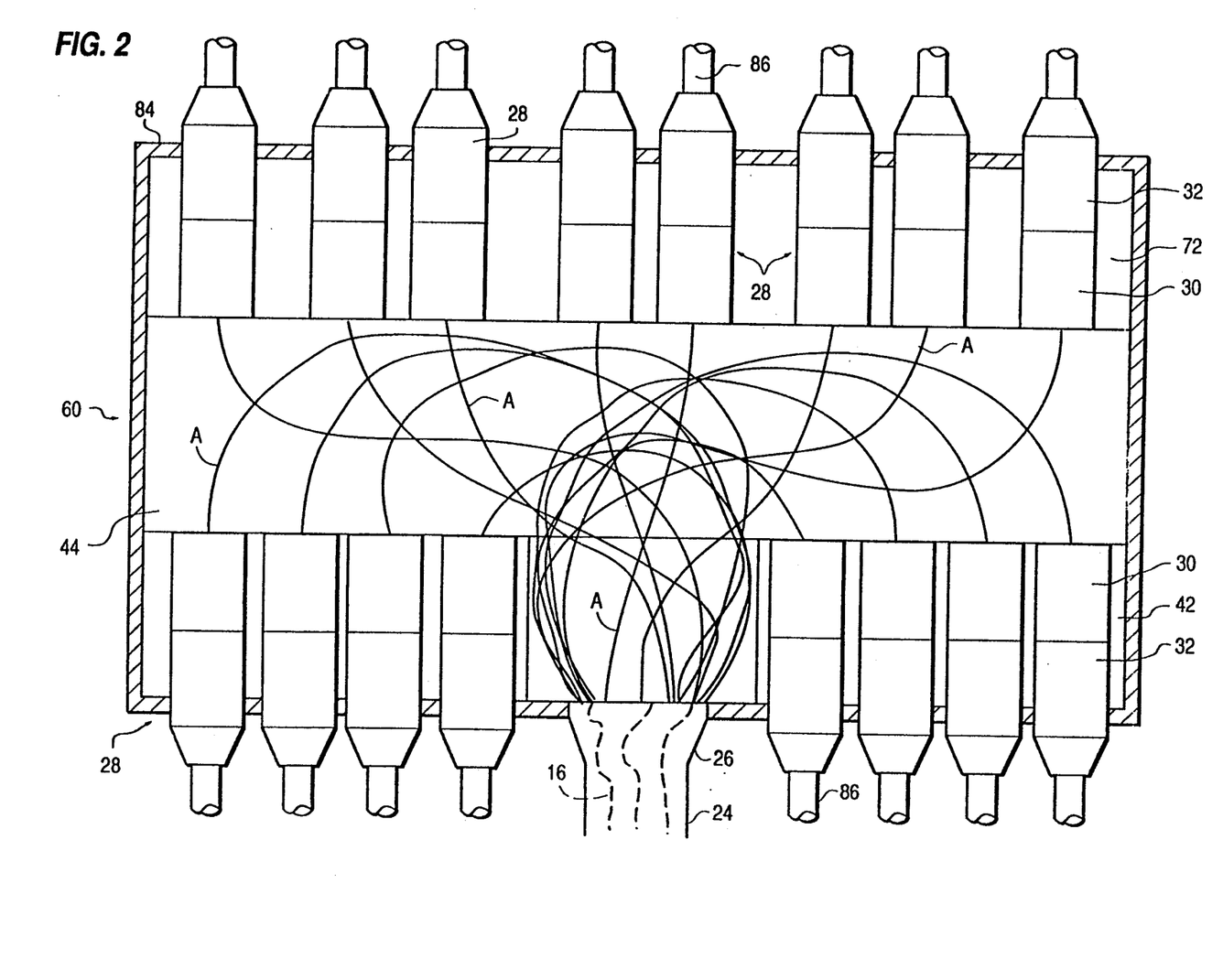
FIG. 2 is a schematic top view of the connector distribution assembly shown in FIG. 1 with the top halves and fan out area cover removed, illustrating particularly how the fiber bundle is split into groups of fibers.

As shown in FIG. 2, which is a top view of the assembly 12 shown in FIG. 1, once inside the assembly 12 the sixteen groups A of thirty-two fibers each are separated in a fan out area 60 on the top of the fan out block 44.

The fan out area 60 allows slack to exist in the groups A of fibers. If this slack did not exist, any pulling of the focal plane array 14 relative to the assembly 12 would cause the fibers to pull away at the connectors 28 described below and break. With the slack, the pulling only takes up the slack and therefore eliminates the stress at the connectors 28.

Figure 3:
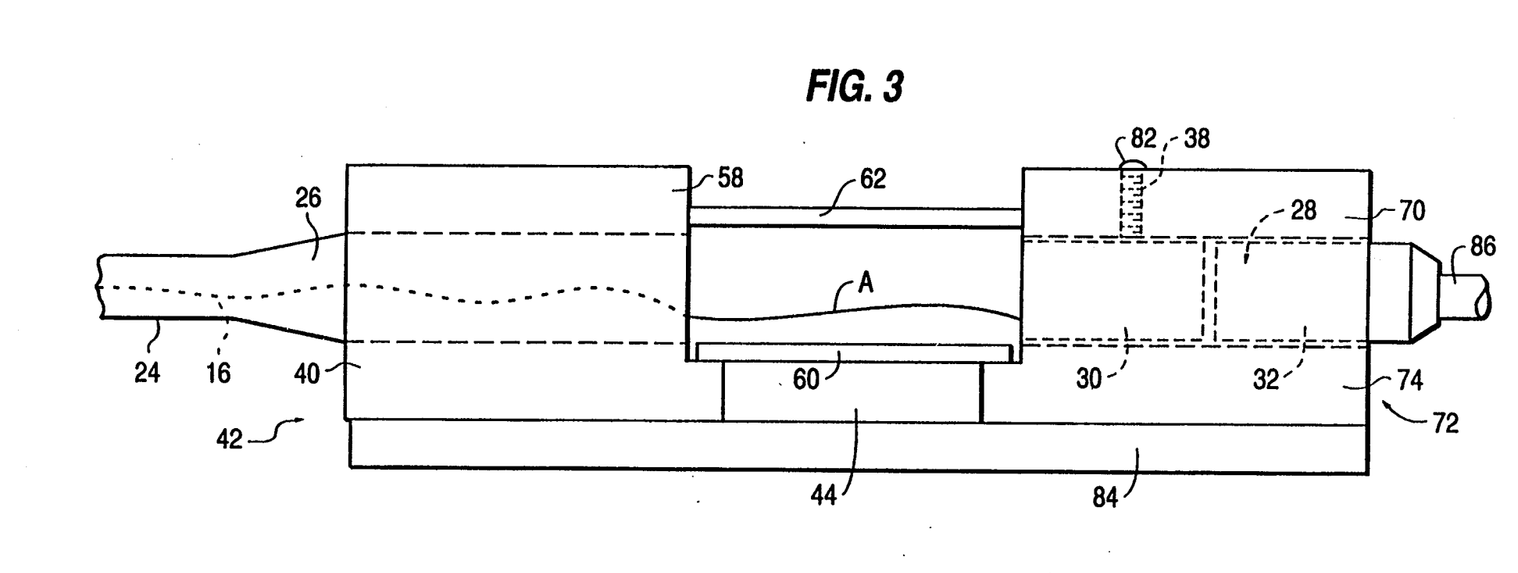
FIG. 3 is a side view of the connector distribution assembly shown in FIG. 1, with the top halves and fan out area cover thereon.

A fan out block cover 62 shown in FIGS. 1 and 3 further protects the groups of fibers A in the fan out area 60 from being damaged.

Figure 4:
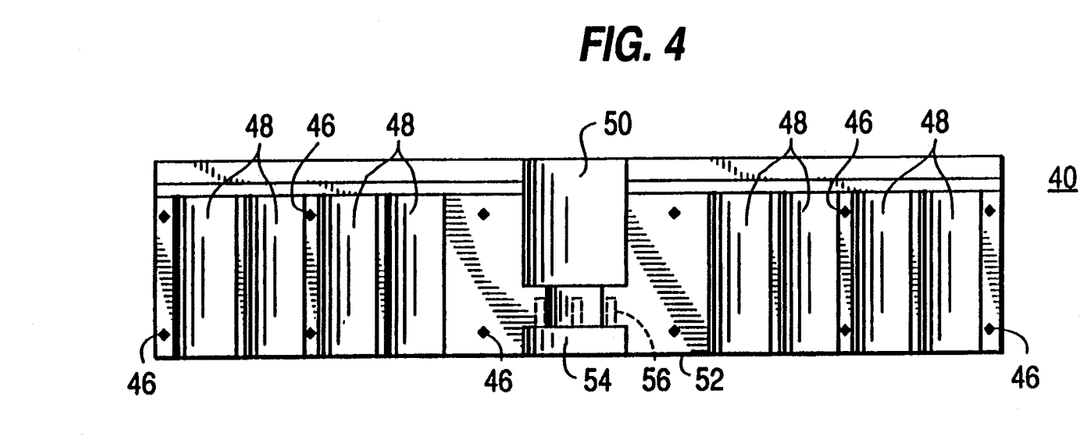
FIG. 4 is a top view of the bottom half of the front piece of the connector distribution assembly.
Figure 5:
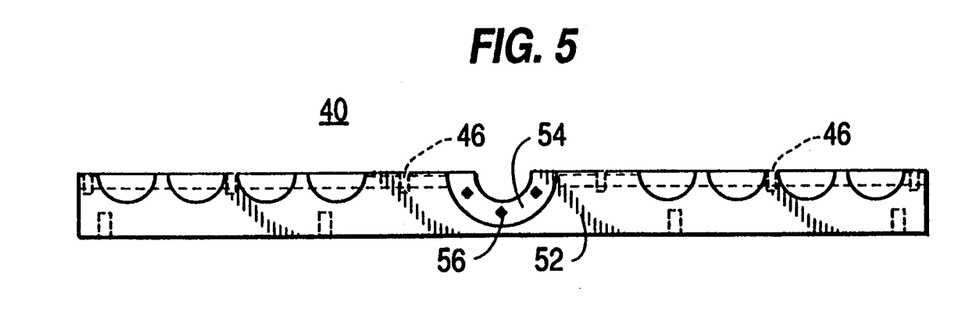
FIG. 5 is a front view of the bottom half of the front piece of the connector distribution assembly shown in FIG. 4.
Figure 6:
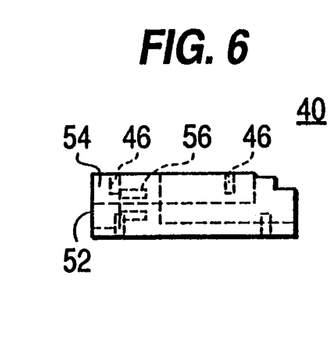
FIG. 6 is a left side view of the bottom half of the front piece of the connector distribution assembly shown in FIG. 4.

FIGS. 4, 5 and 6 are top, front and left side views respectively, of a bottom half 40 of the front piece 42. The top half 58 (FIGS. 1, 3) of the front piece 42 is substantially the same as the bottom half 40 shown, except that the top half 58 includes holes (not shown) for receiving screws at the same locations where screw holes 46 are indicated in FIGS. 4-6, for connecting the bottom 40 and top 58 halves together, as well as screw holes 38 (FIGS. 1 and 3) for securing the connectors 28 in the assembly 12, as described below.

The bottom half 40 includes eight semi-cylindrical recesses 48, four on each side of a relatively larger central recess 50. On a front surface 52 of the bottom half 40 there is formed a semi-cylindrical recess 54 for connecting the strain relief 26. This connection recess 54 includes screw holes 56 for this purpose.

When the top 58 and bottom 40 halves of the front piece 42 are connected via screws fitting in holes 46, eight cylindrical portions are formed by the corresponding recesses 48 and each receives two halves 30, 32 of each connector 28.

Figure 7:
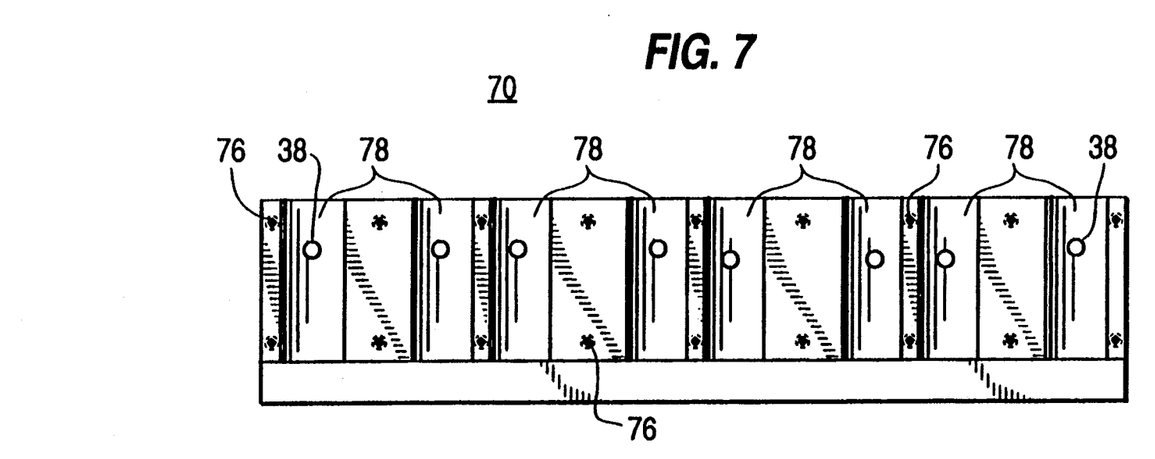
FIG. 7 is a bottom view of the top half of the back piece of the connector distribution assembly.
Figure 8:
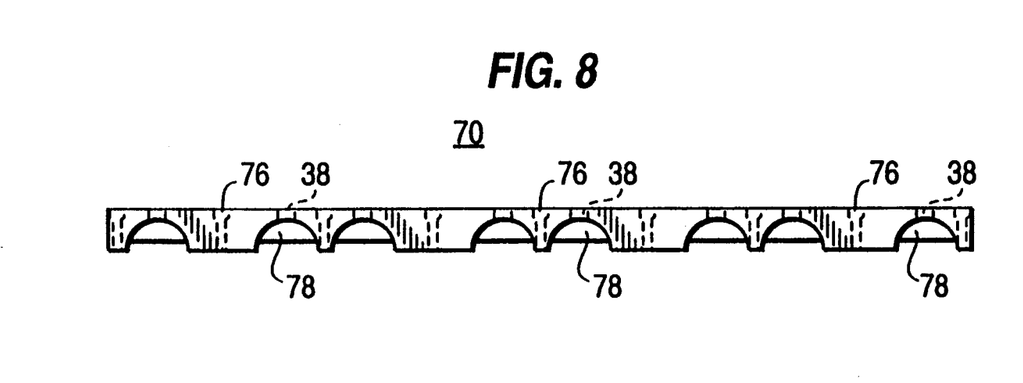
FIG. 8 is a front view of the top half of the back piece of the connector distribution assembly.
Figure 9:
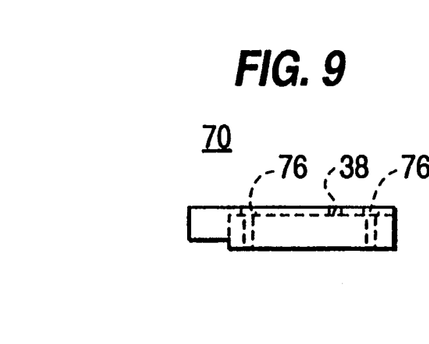
FIG. 9 is a left side view of the top half of the back piece of the connector distribution assembly.

FIG. 7, 8 and 9 show bottom, front and side views of a top half 70 of the back piece 72 of the connector distribution assembly 12.

The top half 70 of the back piece 72 includes holes 76 for connecting the top 70 and bottom halves 74 together, eight parallel semi-cylindrical recesses 78, and holes 38 for receiving set screws 82 (FIGS. 1 and 3). Note that there is no relatively larger central recess as in the front piece 42 described above, since the bundle attaches only to the front piece 42.

Again, the bottom half 74 is substantially similar to the top half 70 except that the bottom half 74 lacks the holes 38 and set screws 82.

When the top 70 and bottom 74 halves of the back piece 72 are connected via screws (not shown) in holes 76, each of eight cylindrical portions formed by the corresponding recesses 78 receives the two halves 30, 32 of each connector 28.

The front piece 42 and back piece 72 can be connected to the fan out block 44 by, e.g. screws. These members can be made of aluminum, plastic, etc.

As also shown in FIGS. 2 and 3, each group A of fibers enters the first, inner half 30 of each connector 28 where it is transformed into a linear array of thirty-two fibers B. A second, outer half 32 of the connector 28 houses a corresponding linear array of relatively larger diameter fibers C. Three screws (not shown) connect to and couple the connector halves 30, 32 together, thereby butt-coupling the fibers B, C together and allowing light to transfer from one array to the other array with little light loss. Ball bearings (not shown) facilitate the alignment of the connector halves 30, 32.

The assembly 12 rigidly aligns and holds the connectors 28 in place by the combination of the plurality of holes 38 and set screws 82. The set screws 82 put pressure against the first halves 32 of the connectors 28 to keep the connectors 28 from moving relative to the assembly 12. As noted above, other screws in the connector 28 itself keep the two halves 30, 32 of the connector 28 together. This combination keeps the connector 28 from rotating or moving with respect to the connector distribution assembly 12 and thereby keeps the fibers from pulling away from the connectors 28.

The top pieces 58, 70 keep dust from entering between the connector halves 30, 32. If dust were allowed to enter, it would settle between the two different diameter fibers B, C, and divert the light. This would prevent light from entering the larger fibers C and cause light leakage, or cause the light to enter a neighboring fiber C which would then give an erroneous measurement.

Shock and vibration isolation also helps keep the connector halves 30, 32, from moving with respect to each other. This isolation is achieved by connecting the assembly 12 to a shock/vibration isolation pad 84 by e.g. screws, epoxy, etc. The pad 84 can be made of any material that provides shock/vibration protection. It could also be designed for an environment of certain vibrational frequencies and shock.

If any fiber breaks or otherwise becomes inoperative and requires repair, the assembly 12 is designed to allow for easy disassembly of the cover 62 or top halves 58, 72.

Also, the second half 32 of each connector 28 is not fully covered by the assembly 12. Thus, one can take the connector 28 apart and replace the second half 32 without removing the top halves 58.70. This can be done while preventing dust from getting on the first half 30 of the connector 28.

Returning to FIGS. 1-3, the larger fibers C from each second half 32 of the connectors 28 are then transformed to a round bundle 86 that is directed via a strain relief 90 and monocoil 92 to a respective detector card 100 (three only shown for clarity because in this first embodiment there would be sixteen). The fibers C are again strain relieved at the detector cards 100 by strain relief assemblies 94,96.

The strain relief assembly for the detector card 100 can take the form of the one described in the Assignee's co-pending application, entitled "Detector Card Strain Relief Assembly", U.S. Pat. application Ser. No. 08/039,736, mailed Mar. 29, 1993 now U.S. Pat. No. 5,315,681, the disclosure of which is expressly incorporated herein.

Once at the strain relief assembly 94 & 96 the thirty-two fibers are split up and individually enter respective detector cans 98 (four shown in each detector card 100 for clarity but in this embodiment there would be thirty-two). Each detector can 98 is mounted on a detector card 100 which is a PC board or similar mount.

The ruggedness and vibration/shock isolation of the above-described assembly 12 prevents the fibers B, C, in the connectors 28 from separating which would and cause light loss.

The assembly 12, by incorporating strain reliefs, also safeguards the fibers from breakage during rough handling.

The provision of a dust-free environment keeps dust from settling between the connector halves 30, 32 and destroying the light throughout of the system 10.

This design also allows a connector 28 to be disconnected and connected easily for repair, and allows use of a thirty-two fiber connector that performs well and can be made cheaply.

The compact size of the system 10 allows the assembly 12, sixteen connectors 28, various monocoils and strain reliefs, sixteen detector cards, and necessary electronic ribbon cables to fit into the chassis 18, which can be a standard $24'' \times 16'' \times 12''$ electronics chassis.

FIGS. 10–14 illustrate a fiber optic detector system 102 incorporating a connection distribution assembly 104 according to a second embodiment of the present invention. In this embodiment the assembly 104 connects one hundred and twenty-eight fibers instead of the five hundred and twelve fibers shown in the first embodiment described above. This second embodiment of the assembly 104 incorporates the same general features as the first, but with fewer fibers/connectors. This is only one example of how the invention can be extended to other combinations of fibers.

In FIGS. 10 and 14 there again are shown a monocoil 106 and a strain relief 108 used to connect a bundle or cable 110 of the one hundred and twenty-eight fibers to a the assembly 104.

Figure 10:
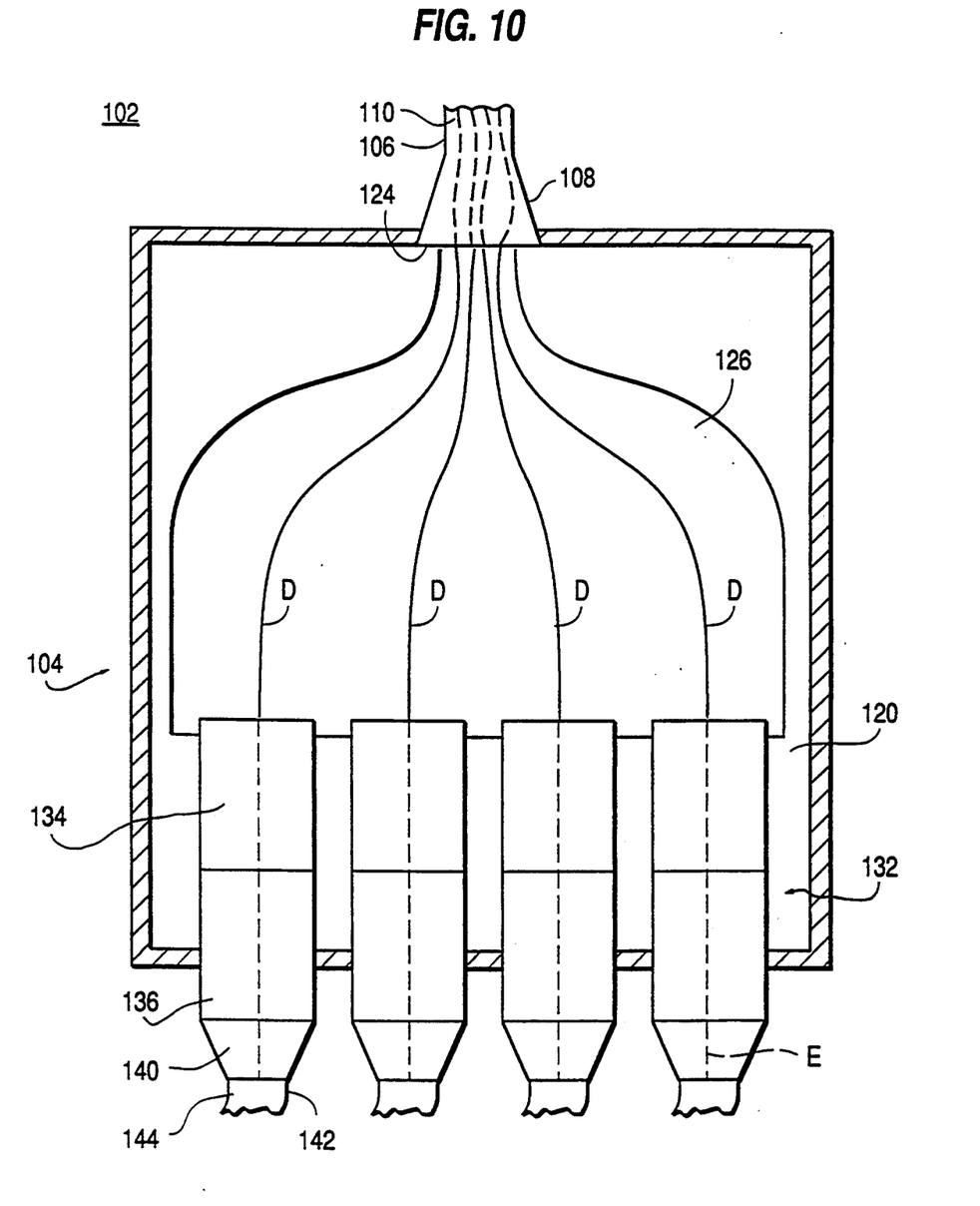
FIG. 10 is a schematic view of a second embodiment of a connector distribution assembly used in a fiber optic detector system, with the top piece removed, according to the present invention.

The assembly 104 generally includes a bottom fan out block piece 120 and a top fan out block piece 122.

Figure 11:
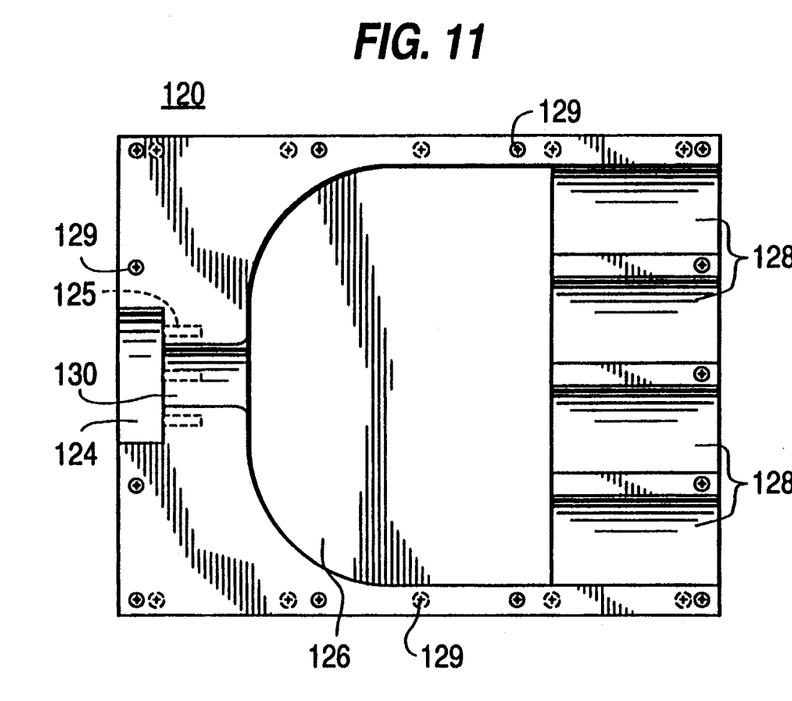
FIG. 11 is a top view of a connector distribution assembly bottom piece used in the second embodiment shown in FIG. 10.
Figure 12:
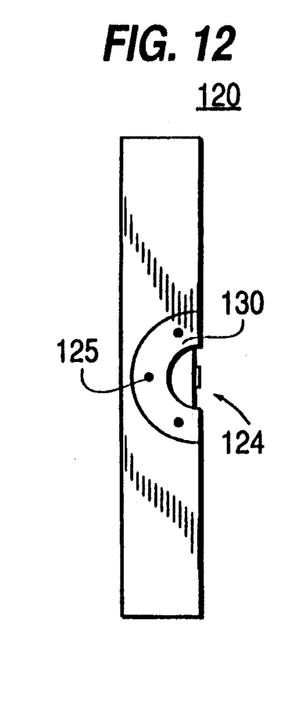
FIG. 12 is a left side view of the bottom piece shown in FIG. 11.
Figure 13:
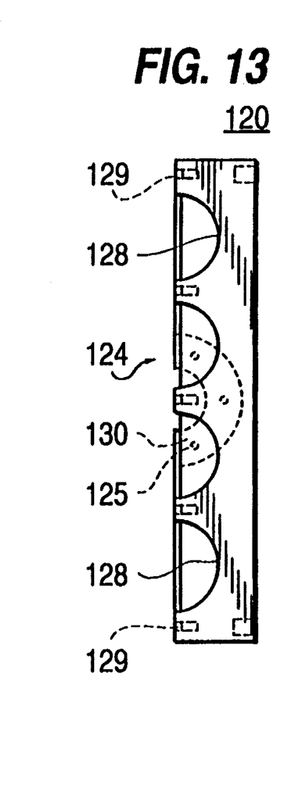
FIG. 13 is a right side view of the bottom piece.
Figure 14:
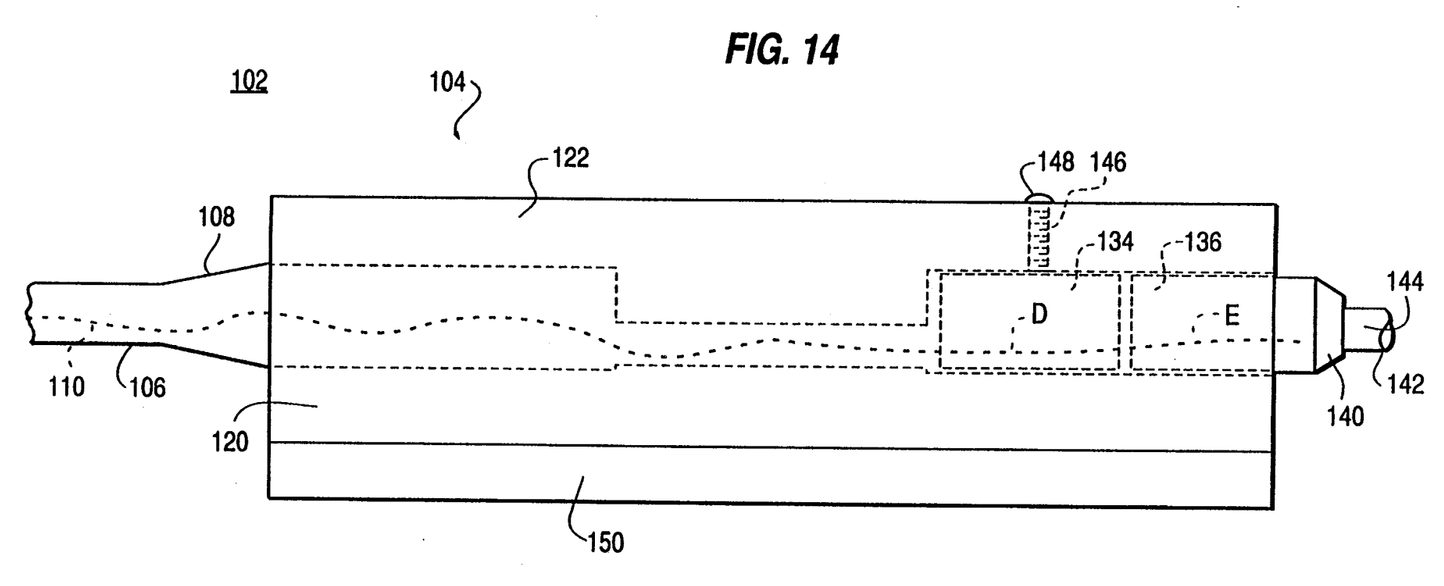
FIG. 14 is a side view of the connector distribution assembly shown in FIG. 10 with the top piece thereon.

FIGS. 11, 12 and 13 show top, front and rear views of the bottom piece 120 of the connector distribution assembly 104. The bottom piece 120 is rectangular and includes a connection 124 for a strain relief at a left end (relative to FIG. 11). The connection 124 includes screw holes 125 for connecting the strain relief via screws (not shown). The bottom piece 120 also includes a fan out area 126, and a group of four semi-cylindrical recesses 128 at a right end. Further, a semi-cylindrical recess 130 is formed at the left end of the bottom piece 120.

The top piece 122 of the connector distribution assembly 104 is substantially similar to the bottom 120.

There is a plurality of screw holes 129 formed in the bottom piece 120 for connecting the bottom piece 120 and top piece 122, as with the first embodiment described above.

When the bottom piece 120 and top piece 122 are connected, the corresponding respective recesses 130 at the left end, and recesses 128 at the right end cooperate to form cylindrical portions for receiving the bundle 110 and four connectors 132, respectively, each connector having a first half 134 and a second half 136.

Once inside the assembly 104, the one hundred and twenty-eight fibers in the bundle 110 break into four groups D of thirty two fibers each. As with the first embodiment, the relatively smaller fibers in groups D enter the first half 134 of each connector 132 and are butt-coupled to larger fibers E located in each second half 136 of each connector 132. The larger fibers E from each connector 132 are then transformed to a round bundle or cable 144 that is directed via a strain relief 140 and a monocoil 142 to a respective detector card like the one shown in FIG. 1., again using subsequent strain relief and a monocoil.

The assembly 104 also includes in the top piece 122 a plurality of holes 146 each corresponding in position to a first half 134 of a connector 132. Respective screws 148 fit into each hole 146 to maintain the orientation of the connectors 132 relative to the assembly 104.

Finally, the assembly 104 is placed on a shock/vibration isolation pad 150 as in the first embodiment described above.

The foregoing is considered illustrative only of the principles of the invention. For example, discussed above are two preferred embodiments, one distributing five hundred and twelve fibers, and the other distributing one hundred and twenty-eight fibers. The functions of the two systems are basically the same. However, any other numbers of fibers can be used. Further, since numerous other modifications and changes will readily occur to those skilled in the art, it is not desired to limit the invention to the exact construction and operation shown and described. Accordingly, all suitable modifications and equivalents may be resorted to that fall within the scope of the invention and the appended claims.

We claim:

1. A fiber optic connector distribution assembly in a fiber optic detector system for receiving groups of optical fibers and protectively distributing the groups through separate optical fiber connectors, comprising:
   first means for receiving a first plurality of optical fibers;
   second means for receiving optical fiber connectors;
   a first plurality of optical fiber connectors;
       third means adjacent the first means for separating the first plurality of optical fibers into groups of optical fibers, each group connecting to one end of each first optical fiber connector of said first plurality of optical fiber connectors;
   a second plurality of optical fibers separated into groups, each group being connected to a second end of each of said optical fiber connectors of the first plurality of fiber optic connectors, and extending out of the assembly;
   a second plurality of optical fiber connectors;
   wherein a first end of each second optical fiber connector receives one of the groups of the first plurality of optical fibers, and wherein a second end of each second optical fiber connector receives one of the groups of the second plurality of optical fibers, and further wherein each optical fiber connector includes first and second halves; and
   wherein the first and second halves of each fiber optic connector abut to transmit light from the group of the first plurality of optical fibers received by the first half of the optical fiber connector to the group of the second plurality of optical fibers received by the second half of the optical fiber connector.

2. The assembly as recited in claim 1, wherein a diameter of each of the fibers of the first plurality of fibers is less than a diameter of each of the fibers of the second plurality of fibers.

3. The assembly as recited in claim 1, wherein the second means comprises a front portion having a bottom and a top connected with the first connectors therebetween, and a back portion having a bottom and a top connected with the second connectors therebetween.

4. The assembly as recited in claim 3, wherein the third means comprises a fan out area between the front and back portions, and a cover over the fan out area for protecting the groups of first fibers.

* * * * *